(12) United States Patent
Prater

(10) Patent No.: US 7,796,892 B2
(45) Date of Patent: Sep. 14, 2010

(54) OPTICAL TRANSCEIVER MODULE HAVING WIRELESS COMMUNICATIONS CAPABILITIES

(75) Inventor: Rudy L. Prater, Campbell, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 528 days.

(21) Appl. No.: 11/772,881

(22) Filed: Jul. 3, 2007

(65) Prior Publication Data

US 2009/0010651 A1    Jan. 8, 2009

(51) Int. Cl.
*H04B 10/00* (2006.01)
(52) U.S. Cl. .................. 398/138; 398/115; 398/139
(58) Field of Classification Search .............. 398/115, 398/118, 138, 139
See application file for complete search history.

(56) References Cited

U.S. PATENT DOCUMENTS

| | | | | |
|---|---|---|---|---|
| 5,786,923 A | * | 7/1998 | Doucet et al. | 398/122 |
| 2005/0111845 A1 | * | 5/2005 | Nelson et al. | 398/138 |

* cited by examiner

*Primary Examiner*—Dalzid Singh

(57) ABSTRACT

An optical transceiver module includes a wireless communications device that provides the transceiver module with the ability to receive wireless signals in and/or transmit wireless signals from the optical transceiver module. The wireless communications device may have various configurations for providing various capabilities, such as, for example, a wireless modem, a wireless transmitter, a wireless receiver, a wireless transceiver, and a wireless network access point. The wireless communications device may be configured to transmit and/or receive wireless signals corresponding to, for example, calls, pages, and data transfers.

30 Claims, 8 Drawing Sheets

OPTICAL TRANSCEIVER MODULE HAVING WIRELESS COMMUNICATIONS CAPABILITIES

TECHNICAL FIELD OF THE INVENTION

The invention relates to optical transceiver modules used to transmit and receive optical signals over an optical communications network. More particularly, the invention relates an optical transceiver module having wireless communications capabilities in addition to its normal optical communications capabilities.

BACKGROUND OF THE INVENTION

Optical transceiver modules are used to transmit and receive optical signals over optical communications networks. These modules typically use lasers to generate optical signals that are then transmitted over optical fibers and photodiodes to receive optical signals, which are then demodulated to recover the data. The modules typically include a transceiver module controller that controls the operations of the transceiver module. This controller is typically in communication with a remote host computer via a wired link of some sort to allow the transceiver module to be remotely monitored. The host computer typically monitors the transceiver operations and may send maintenance signals to the transceiver module for various purposes, such as to control the laser drivers to ensure that the optical signals produced by the lasers have the proper output intensity levels.

FIG. 1 illustrates a block diagram of a transceiver module 2 currently used in optical communications. The transceiver module 2 includes a transmitter portion and a receiver portion. The transmitter and receiver portions are controlled by a transceiver module controller 14. The transmitter portion includes a laser driver 1, a laser 12, a monitor photodiode 13, and a transceiver module controller 14. The laser 12 is typically a laser diode. The laser driver 11 receives an input data signal, Data In, and generates electrical signals that are used to directly modulate the laser diode 12 to cause it to output optical signals that have power levels corresponding to logic 1s and logic 0s. An optics system (not shown) of the transceiver module 2 focuses the coherent light beam produced by the laser diode 12 into the end of a transmit optical fiber 15 held within a connector (not shown) that mates with the transceiver module 2.

The monitor photodiode 13 monitors the output power level of the laser diode 12 and produces an electrical analog feedback signal that is delivered to the transceiver module controller 14. The controller 14 processes the feedback signal to determine the average output power level of the laser diode 12. The controller 14 outputs control signals via line 17 to the laser driver 11 to cause it to adjust the bias current signal it outputs to the laser diode 12 such that the average output power level of the laser diode 12 is maintained at a relatively constant level.

The receiver portion of the transceiver module 2 includes a receive photodiode 21 that receives an incoming optical signal output from the end of a receive optical fiber 22. An optics system (not shown) of the receiver portion focuses the light output from the end of the receive optical fiber 22 onto the receive photodiode 21. The receive photodiode 21 converts the incoming optical signal into an electrical signal, which is then amplified by an amplifier 25. The amplified signal corresponds to the Data Out signal for the transceiver module. Information relating to the electrical signal received by the amplifier 25 from the photodiode 21 is typically also communicated to the transceiver module controller 14.

The transceiver module controller 14 may be accessible by and communicate with a remote host computer (not shown), as described above, to enable the remote host computer to monitor and/or control the operations of the transceiver module 2. The connection between the transceiver module 2 and the host computer is typically a wired connection for providing a link to a wired network, such as the Internet. The information that is typically communicated between the transceiver module and the host computer is low-bandwidth maintenance data.

For a variety of reasons, it would be desirable to provide communications links other than, or in addition to, the types of wired links that are currently used as communications links between optical transceiver modules and remote host computers. For example, one reason for this is that if the wired communications link fails for some reason, it would be desirable to have an alternate communications link between the transceiver module controller and the host computer. Another example of a reason to have an alternative communication link is to provide an alternative path for the high-speed data that is typically transmitted and received today by optical transceiver modules.

Accordingly, a need exists for an optical transceiver module that is capable of communicating with a remote host computer or other device over a communication link other than the wired link that is typically provided in transceiver modules today.

SUMMARY OF THE INVENTION

The invention provides an optical transceiver module that includes a wireless communications device and method for providing an optical transceiver module with wireless communications capabilities. The wireless communications device is configured to perform one or more of the tasks of transmitting wireless signals from the transceiver module, receiving wireless signals in the transceiver module, and transmitting wireless signals from and receiving wireless signals in the transceiver module.

The method comprises providing an optical transceiver module with a wireless communications device, and in the wireless communications device, performing one or more of tasks of transmitting wireless signals from the transceiver module, receiving wireless signals in the transceiver module, and transmitting wireless signals from and receiving wireless signals in the transceiver module.

These and other features and advantages of the invention will become apparent from the following description, drawings and claims.

DETAILED DESCRIPTION OF AN ILLUSTRATIVE EMBODIMENT

In accordance with embodiments of the invention, a wireless communications device is provided in an optical transceiver module for receiving wireless signals in and/or transmitting wireless signals from the optical transceiver module. The term "optical transceiver module" is used herein to denote a transceiver module that produces optical signals that represent data and transmits them over an optical waveguide from the module and that receives optical signals that represent data that have been transmitted to the optical transceiver module over an optical waveguide. Many of the operations that occur within the module are operations that are performed on electrical signals in the electrical domain. Therefore, the term "optical transceiver module" is not intended to be limited to transceiver modules in which operations are performed exclusively in the optical domain, although the invention would apply equally to such transceiver modules.

Figure 2:
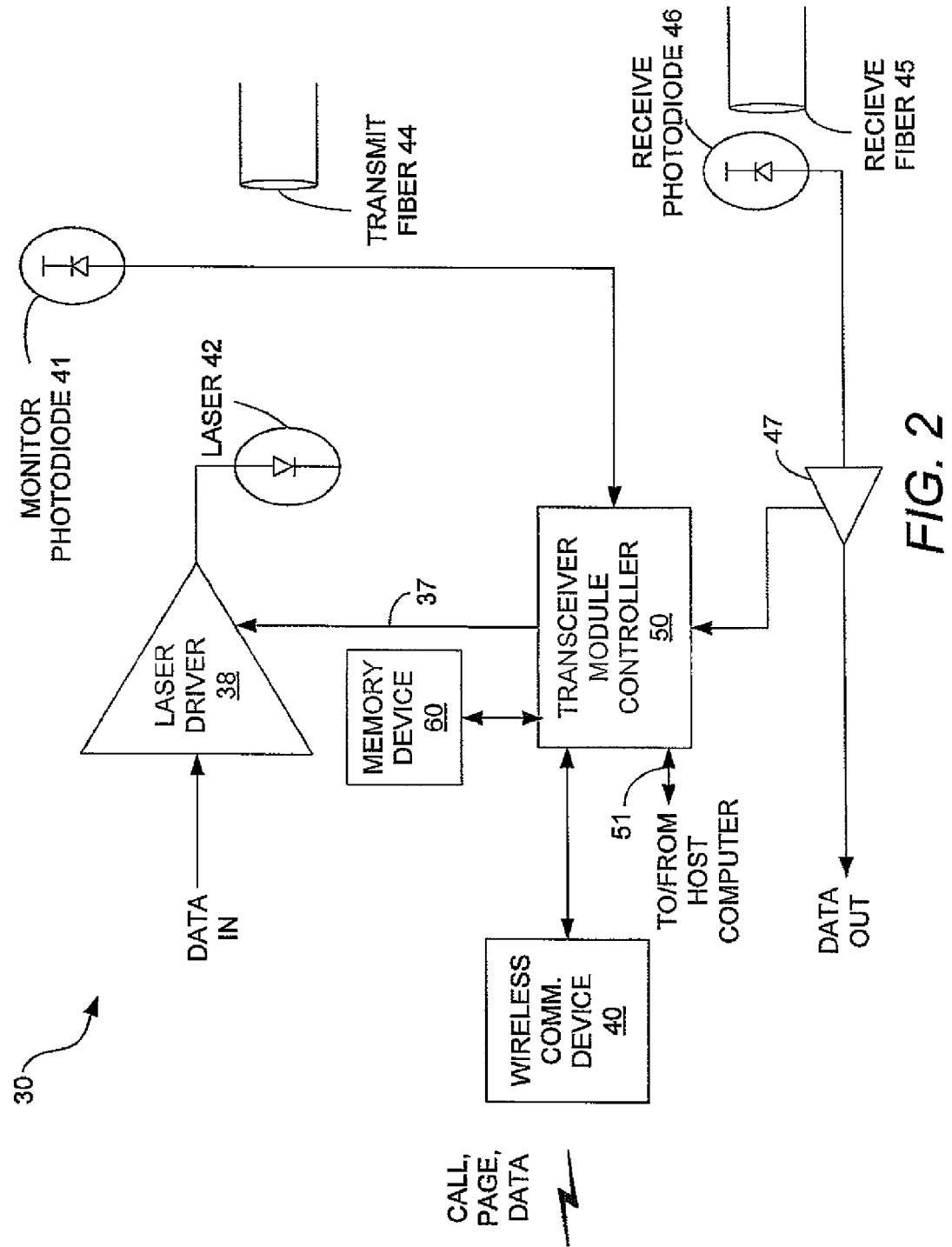
FIG. 2 illustrates a block diagram of a transceiver module in accordance with an illustrative embodiment in which the module includes a wireless communications device that is capable of transmitting and/or receiving wireless calls, pages or data.

FIG. 2 illustrates a block diagram of an optical transceiver module 30 in accordance with an illustrative embodiment. A transceiver module controller 50 controls the operations of the transceiver module 30. The controller 50 outputs signals via line 37 to a laser driver 38 based on electrical feedback from a monitor photodiode 41. The laser driver 38 outputs a bias current and modulation current to the laser diode 42 that cause the laser diode 42 to produce a coherent light beam. The modulation current is based on an input data signal, Data In, to the laser driver 38. The light beam is coupled into the end of a transmit optical fiber 44 and transmitted from the transceiver module 30.

Optical signals that are transmitted to the transceiver module 30 are received by the transceiver module 30 over a receive optical fiber 45 and coupled onto a receive photodiode 46. The receive photodiode 46 converts the received optical signal into an electrical signal, which is amplified by amplifier 47 to produce a Data Out signal, which is the recovered data signal output from the transceiver module 30. The amplifier 47 is typically connected to the transceiver module controller 50 to provide information to the transceiver module controller 50 about the received data signal.

Figure 1:
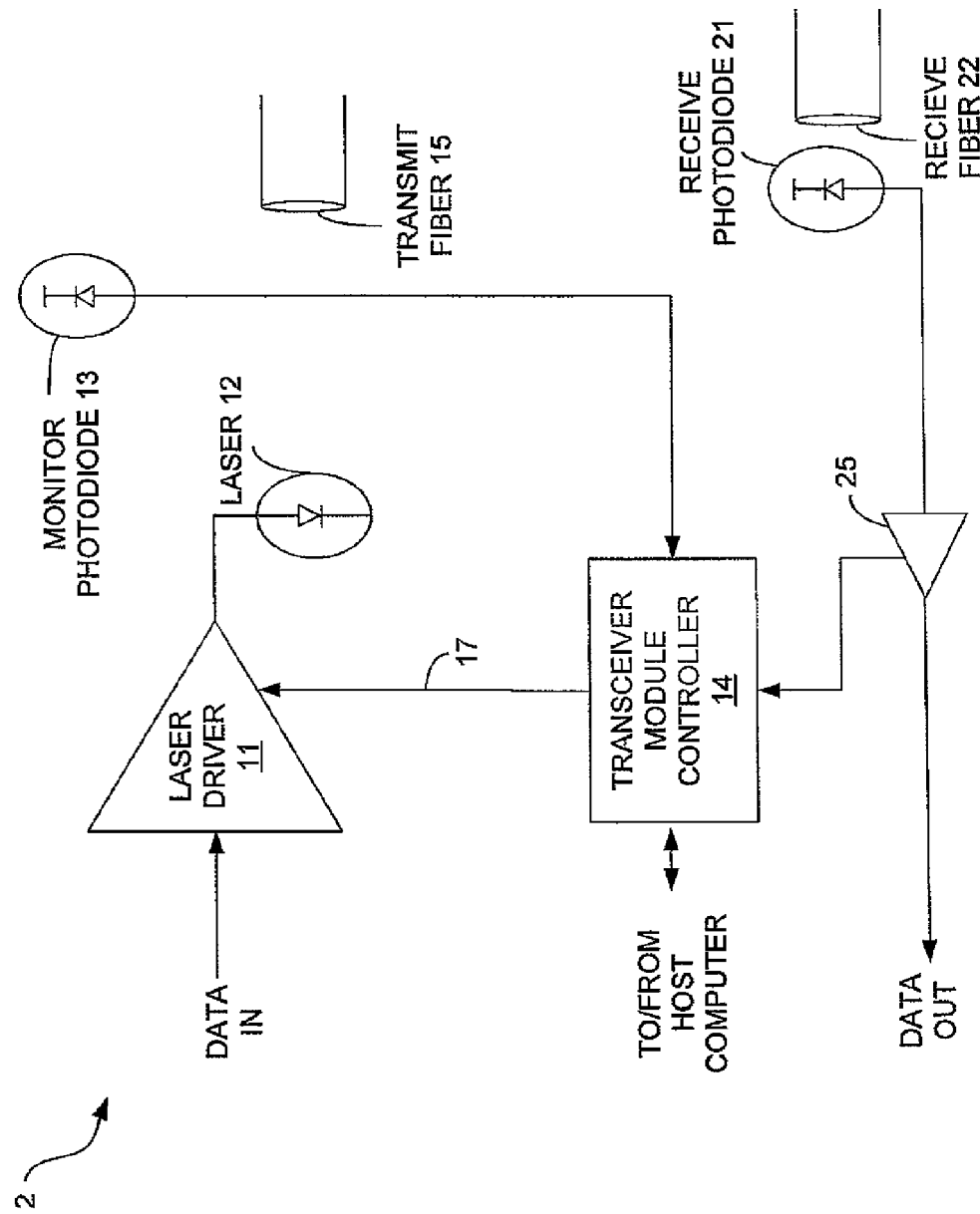
FIG. 1 illustrates a block diagram of a transceiver module currently used in optical communications.

The optical transceiver module 30 typically has a wired communication link 51 of the type described above with reference to FIG. 1 for enabling a remote host computer (not shown) to communicate with the transceiver module. This wired link 51 is typically used to allow maintenance personnel to monitor and/or control operations of the transceiver module 30. For example, the remote host computer may receive information relating to the average output power level of the laser diode 42 and send signals to the controller 50 to cause the controller 50 to send a signal to the laser driver 38 over line 37 that causes the laser driver 38 to adjust the bias current being delivered to the laser diode 42.

In accordance with this embodiment, the optical transceiver module 30 has a wireless communications device 40 that is capable of transmitting and/or receiving wireless calls, pages or data. One purpose for this wireless link would be to provide an alternate path for communications between the transceiver module controller 50 and the remote host computer in the event that the wired link 51 fails. Another purpose for the wireless link is to allow the transceiver module controller 50 to automatically place a call or page to maintenance personnel to notify them that a component of the transceiver module 30 has failed or may fail soon. This allows maintenance personnel to take quick action to correct the problem or to prevent a problem from occurring altogether.

The transceiver module 30 may include a memory device 60 for storing one or more software programs and/or data. The memory device 60 may be, for example, a solid state memory device such as a random access memory (RAM) device, a read only memory (ROM) device, an erasable programmable ROM (EPROM), flash memory, etc. These programs may be executed by the controller 50 to cause it to perform algorithms that diagnose problems that have occurred or that may occur and to automatically call or page or send data via wireless communications device 40 to the remote host computer or to some other location to notify personnel of the problem. The wireless communications device 40 communicates with a wireless network (not shown), which may be bridged to other networks (e.g., twisted pair telephone networks, the Internet, optical networks, etc.). The wireless communications device 40 may be a transmitter for providing one-way communications from the transceiver module 30 to the wireless network. Alternatively, the wireless communications device may be a receiver for providing one-way communications from the wireless network to the transceiver module 30. As another alternative, the wireless communications device 40 may be a transceiver for receiving wireless signals in the transceiver module 30 that are transmitted over the wireless network and for transmitting signals from the transceiver module 30 to the wireless network. In this latter case, the wireless communications device 40 provides two-way wireless communications between the transceiver module 30 and the wireless network.

Figure 3:
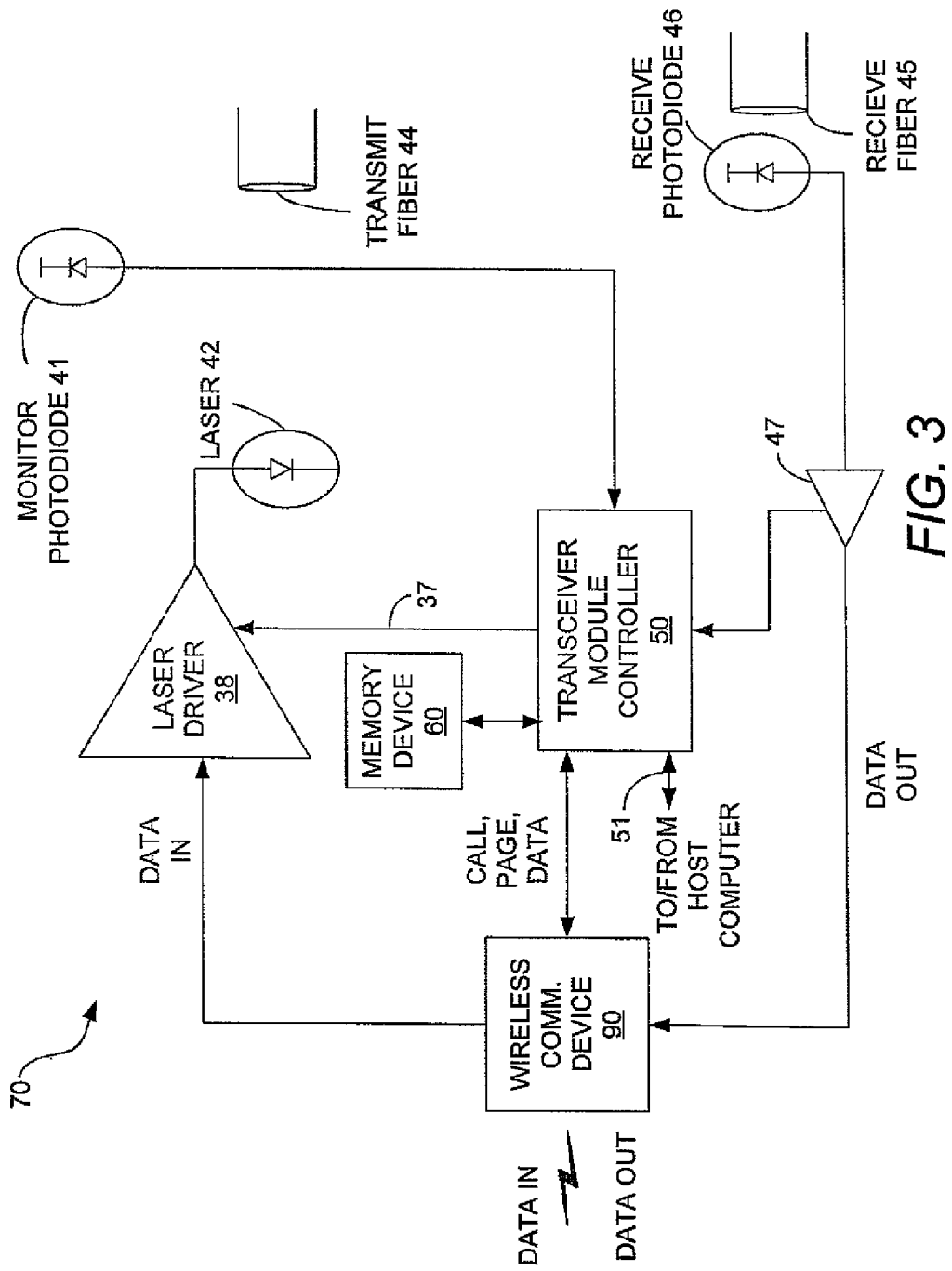
FIG. 3 illustrates a block diagram of a transceiver module in accordance with an illustrative embodiment that includes a wireless communications device for wirelessly receiving high-speed data to be transmitted by the optical transceiver module over a transmit optical fiber and that is capable of wirelessly transmitting high-speed data that has been received by the transceiver module from a receive optical fiber.

FIG. 3 illustrates a block diagram of a transceiver module 70 in accordance with an embodiment that includes a wireless communications device 90 for wirelessly receiving high-speed data to be transmitted by the optical transceiver module 70 over a transmit optical fiber 44 and that is capable of wirelessly transmitting high-speed data that has been received by the transceiver module 70 from a receive optical fiber 45. For ease of discussion and illustration, the elements 37, 38, 41, 42, 44, 45, 46, 47, 50, and 60 of the transceiver module 30 shown in FIG. 2 are shown as being elements of the transceiver module 70 shown in FIG. 3, as indicated by the use of like reference numbers. It should be noted that transceiver modules 30 and 70 need not be identical with respect to these elements.

In accordance with this embodiment, the Data In line that is received at the input of the laser driver 38 is coupled to the wireless communications device 90. Likewise, the Data Out line that is coupled to the output of the amplifier 47 is coupled to the wireless communications device 90. The wireless communications device 90 may also be coupled to the transceiver module controller 50.

With known transceivers of the type described above with reference to FIG. 1, the Data In and Data Out lines are connected to wired links (not shown) external to the transceiver module for inputting data to and outputting data from the transceiver module. In accordance with the embodiment illustrated in FIG. 3, the wireless communications device 90 receives wireless data to be transmitted by the transceiver module 70. This wireless data is then converted by the wireless communications device 90 into data that is suitable for use by the laser driver 38 to modulate the laser 42. The wireless data will typically be in some standard wireless format, and so will need to be converted into a format that is suitable for inputting the data to the laser driver 38. This conversion process may alternatively be performed by some other component of the transceiver module 70, such as by the transceiver module controller 50, for example.

When the laser 42 is modulated by the laser driver 38 based on the Data In signal, the light produced by the laser is coupled into the end of the transmit fiber 44 and transmitted over the optical network. A portion of the light produced by the laser 42 may be coupled onto the monitor photodiode 41, which will then produce an electrical feedback signal that is fed back to the controller 50.

When an optical data signal propagating along the receive fiber 45 is received by the receive photodiode 46, the receive photodiode 46 produces and electrical signal that is then amplified by the amplifier 47 to produce the Data Out signal. The electrical Data Out signal is input to the wireless communications device 90. The wireless communications device 90 converts the Data Out signal into a format that is suitable for transmission over the wireless network. Alternatively, this conversion process may be performed by some other component of the transceiver module 70, such as the controller 50, for example. The wireless communications device 90 then transmits the data over the wireless network or locally to a wireless receiver.

Data transmitted through modern fiber optic transceivers is typically high-speed data, and using a wired link to transmit or receive this data in the transceiver module may generate noise, which may result in degradation of signal integrity. Transmitting this data to the wireless network or locally to a wireless device may allow problems associated with noise and EMI to be avoided. For example, in some cases, an optical transceiver module is mounted inside of a shielded router box on a printed circuit board (PCB). In this environment, the high-speed Data Out signals (e.g., 10 Gigahertz (GHz)) are sometimes routed over PCB traces to other locations in the shielded box. Depending on the lengths of these traces, impedance matching problems can sometimes occur that degrade the quality of the high-speed signals within the transceiver module. By having the wireless communications device 90 in the transceiver module 70, these high-speed signals can be transmitted wirelessly to a wireless receiver (not shown) located in the shielded box, rather than being transmitted over PCB traces to a location in the shielded box. Sending this data wirelessly may prevent signal degradation that can occur when high-speed signals are sent over relatively long traces of the PCB.

As stated above, the transceiver module controller 50 may be connected to the wireless communications device 90 as shown in FIG. 3 to enable the transceiver controller 50 to cause calls, pages and/or data to be wirelessly communicated via wireless communications device 90 over the wireless network, such as for monitoring and maintenance purposes, as described above with reference to FIG. 2. This may be a one-way communications path from the transceiver module 70 to the wireless network. Alternatively, this may be a one-way communications path from the wireless network to the transceiver module 70 to enable the controller 50 to receive commands and/or data from the wireless network via the communications device 90. As yet another alternative, this communications path may be a two-way path between the transceiver module 70 and the wireless network to allow all of these types of communications to occur.

Figure 4:
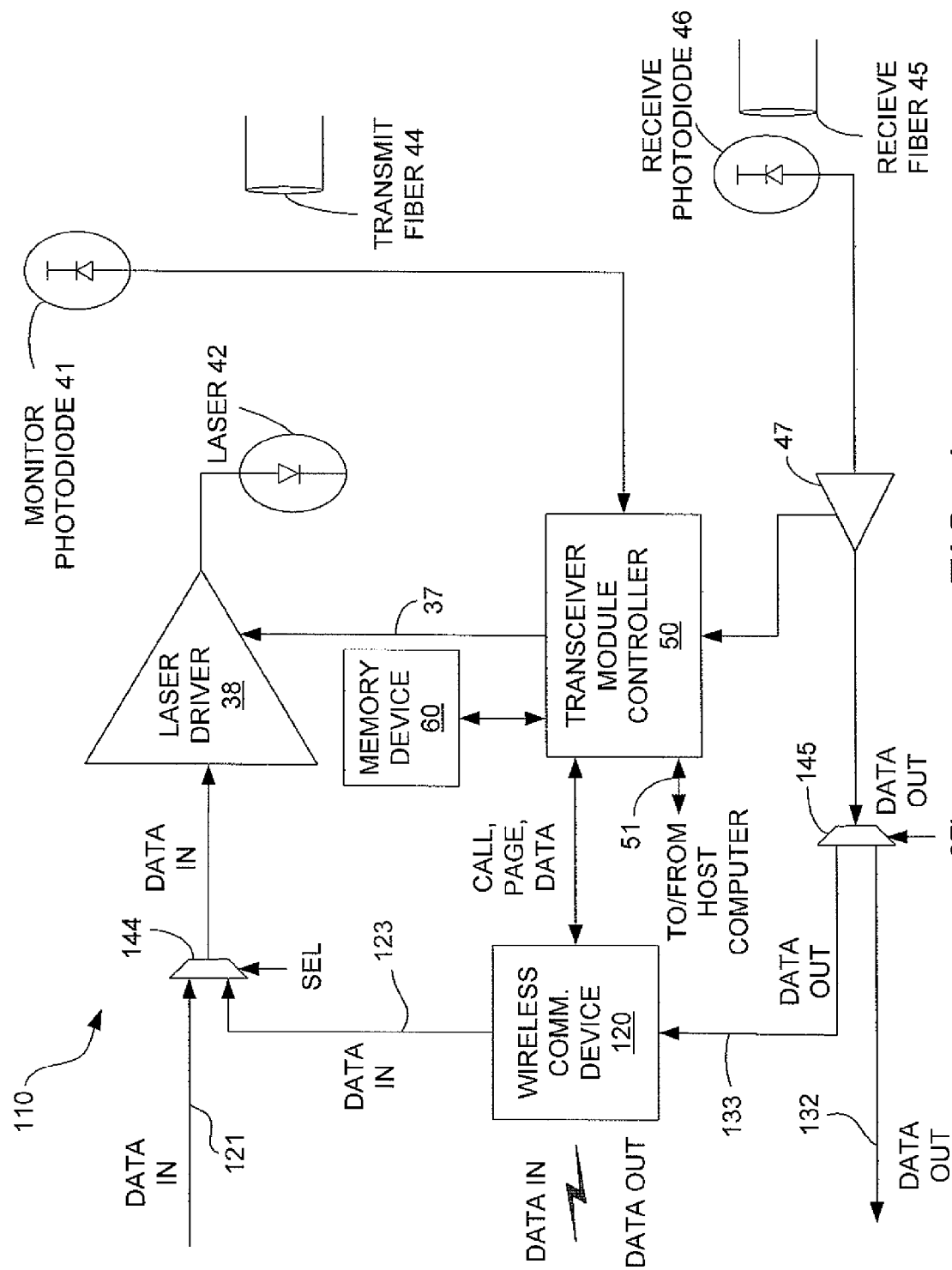
FIG. 4 illustrates a block diagram of a transceiver module in accordance with an illustrative embodiment that has the capabilities of the transceiver module shown in FIG. 3, but in addition has the capability of selecting data to be transmitted by the transceiver from a wired or wireless link and of providing data received by the transceiver module to a wired or wireless link.

FIG. 4 illustrates a block diagram of the transceiver module 110 in accordance with another embodiment. In accordance with this embodiment, the transceiver module 110 has all of the capabilities of the transceiver module 70 shown in FIG. 3, but in addition has the capability of selecting the Data In path to be from either the wireless communications device 120 or from a wired path 121 and has the capability of selecting the Data Out path to be to a wireless link 132 and/or to the wireless communications device 120.

The elements represented by numerals 37, 38, 41, 42, 44, 45, 46, 50, and 60 in FIG. 4 may be, but need not be, identical to the like numbered elements in FIG. 3. The wireless communications device 120 shown in FIG. 4 may be, but need not be, identical to the wireless communications device 90 shown in FIG. 3. In FIG. 4, however, switching elements 144 and 145 are used to select the Data In and Data Out paths. The Data In may be received wirelessly from the wireless network by wireless communications device 120. After the data is converted from the wireless format into a format that is suitable for use by the laser driver 38, the converted data is provided as Data In to the input of a 2-to-1 multiplexer (MUX) 144. The Data In on the wired link 121 is also provided to an input of the MUX 144. A select signal, SEL, delivered from the transceiver module controller 50 to the MUX 144 controls which of the data paths is selected as input to the laser driver 38. When the SEL signal to MUX 144 is deasserted, the data on path 121 is provided as input to the laser driver 38. When the SEL signal to the MUX 144 is asserted, data on path 123 from the wireless communications device 120 is provided as input to the laser driver 38. Thus, data on one or the other of these paths 121 and 123 is used to modulate the laser 42.

When the SEL signal that controls MUX 145 is deasserted by the controller 50, the Data Out path is the wired link 132. When the SEL signal that controls MUX 145 is asserted by the controller 50, the Data Out path is the line 133 to the wireless communications device 120. Data received by the wireless communications device 120 is then formatted into wireless data suitable for transmission over the wireless network and transmitted over the wireless network. There may be situations where it would be desirable to allow the Data Out to be output over the wired link 132 and wirelessly over the wireless link provided by the wireless communications device 120. This can be made possible by providing MUX 145 with a configuration that allows either or both paths to be selected. Although the MUXs 144 amd 145 are shown as being separate switching elements, this switching functionality may be provided in a single switching logic component.

Figure 5:
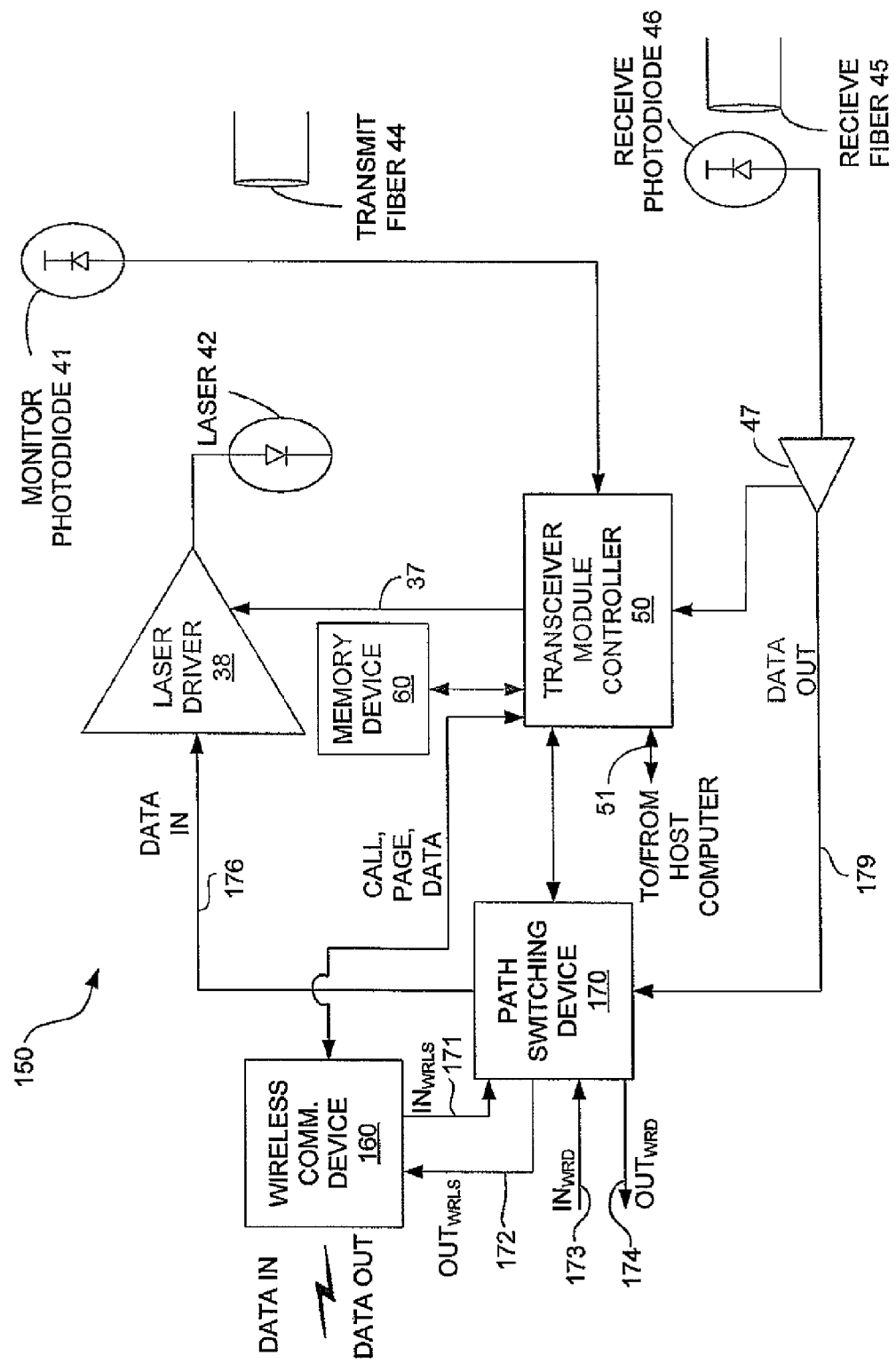
FIG. 5 illustrates a block diagram of a transceiver module in accordance with an illustrative embodiment that has the capabilities of the transceiver module shown in FIG. 4, but also has additional routing capabilities.

FIG. 5 illustrates a block diagram of the transceiver module 150 in accordance with another embodiment. The elements represented by numerals 37, 38, 41, 42, 44, 45, 46, 50, and 60 in FIG. 5 may be, but need not be, identical to the like numbered elements in FIG. 4. The wireless communications device 160 shown in FIG. 5 may be, but need not be, identical to the wireless communications device 120 shown in FIG. 4. In addition to these common elements, in accordance with this embodiment, a path-switching device 170 is provided that allows many different routing scenarios to be achieved, as will now be described.

The path switching device 170 is controlled by the transceiver module controller 50. Based on control signals received from the controller 50, the path switching device 170 makes internal connections that cause signals to be routed to particular paths. The path switching device 170 has a wireless-in path 171, denoted $IN_{WRLS}$, a wireless-out path 172, denoted $OUT_{WRLS}$, a wired-in path 173, denoted $IN_{WRD}$, and a wired-out path 174, denoted $OUT_{WRD}$. The path switching device 170 preferably is configurable to do one or more of the following routing functions: (1) route a signal on the $IN_{WRLS}$ line 171 onto the Data hi line 176; (2) route a signal on the $IN_{WRLS}$ line 173 onto the Data In line 176; (3) route a signal on the $IN_{WRLS}$ line 171 onto the $OUT_{WRD}$ line 174; (4) route a signal on the $IN_{WRD}$ line 173 onto the $OUT_{WRLS}$ line 172; (5) route a signal on the Data Out line 179 onto the Data In line 176; (6) route a signal on the Data Out line 179 onto the $OUT_{WRLS}$ line 172; and (7) route a signal on the Data Out line 179 onto the $OUT_{WRD}$ line 174.

One or more of routing options (1)-(7) may not be needed. Consequently, the path switching device 170 may be configurable to perform only the needed routing functions. However, by providing the path switching device 170 with the ability to perform all of the routing functions associated with options (1)-(7), the transceiver module 150 is provided with great flexibility.

Figure 6:
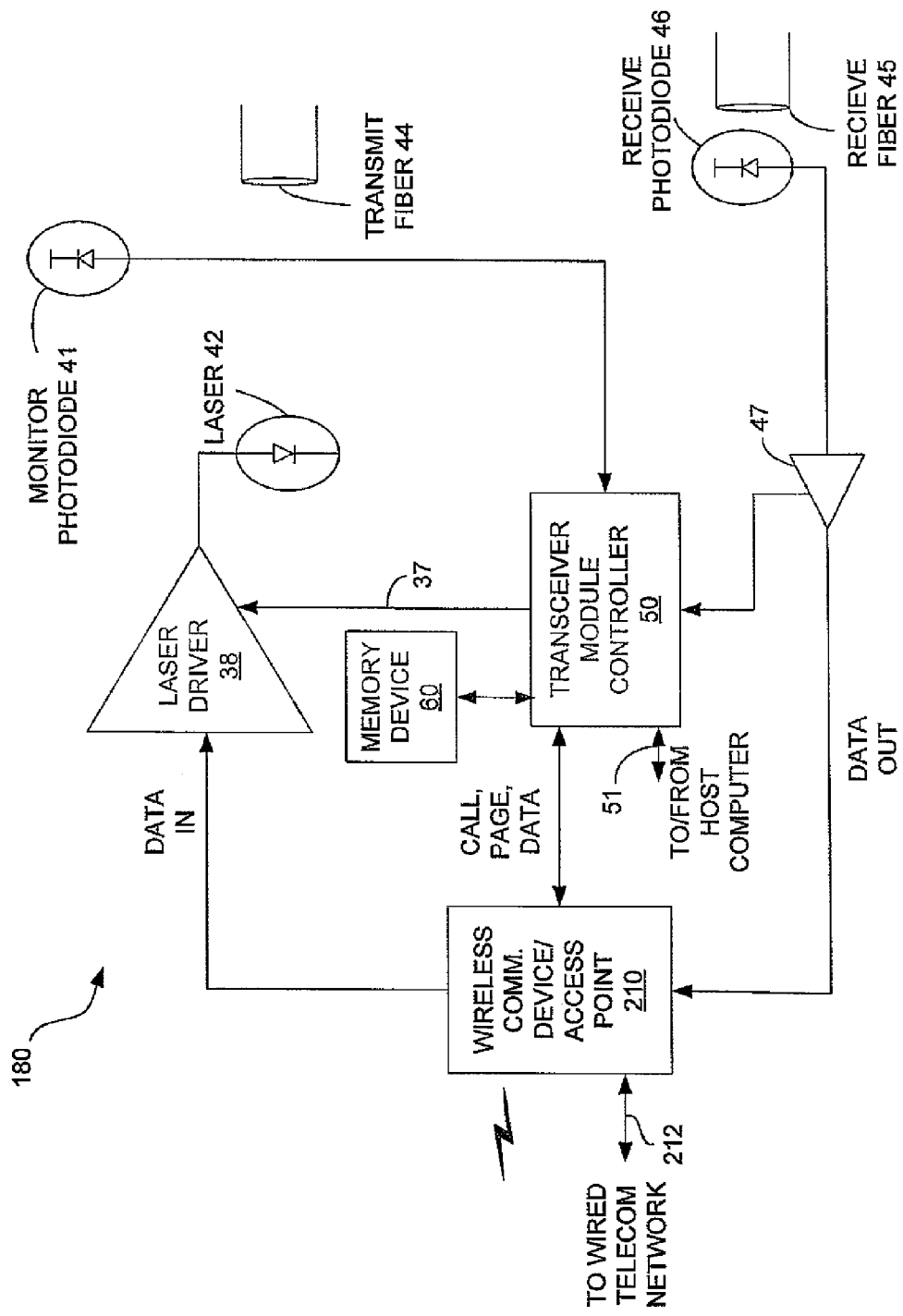
FIG. 6 illustrates a block diagram of a transceiver module in accordance with another illustrative embodiment having a wireless communications device which functions as a wireless network access point.

FIG. 6 illustrates a block diagram of an optical transceiver module 180 in accordance with another embodiment having a wireless communications device 210 that acts as a wireless network access point. The elements represented by numerals 31, 38, 41, 42, 44, 45, 46, 50, and 60 in FIG. 6 may be, but need not be, identical to the like numbered elements in FIG. 5. The wireless communications device/access point 210 of the transceiver module 180 is connected via a wired link 212 to a wired telecommunications network (not shown) so that wireless callers are able to access the wired telecommunications network via the wireless communications device/access point 210.

A variety of modifications can be made to the transceiver module 180 shown in FIG. 6 to provide additional or different functionality. For example, the wired link 212 could be eliminated without necessarily preventing users from being able to access other telecommunications networks. For example, assuming the wired link 212 is eliminated or becomes inoperative, a wireless device user can transmit data to the wireless communications device/access point 210, which will then convert the wireless data into a Data In stream to be used by the laser driver 38 to modulate the laser 42. The corresponding data is then coupled as optical signals into the transmit fiber 44 and sent out over the fiber network to one or more of a variety of telecommunications networks that are bridged to the fiber network by one or more appropriate gateway devices (not shown). Data that is communicated back to the transceiver module 180 in response to the transmitted data will be directed onto the photodiode 46, which converts the optical data signal into an electrical signal, which is then amplified by the amplifier 47. The output of the amplifier 47 is then received by the wireless communications device/access point 210, converted into wireless format data, and transmitted wirelessly back to the wireless device user who initiated the call.

Figure 7:
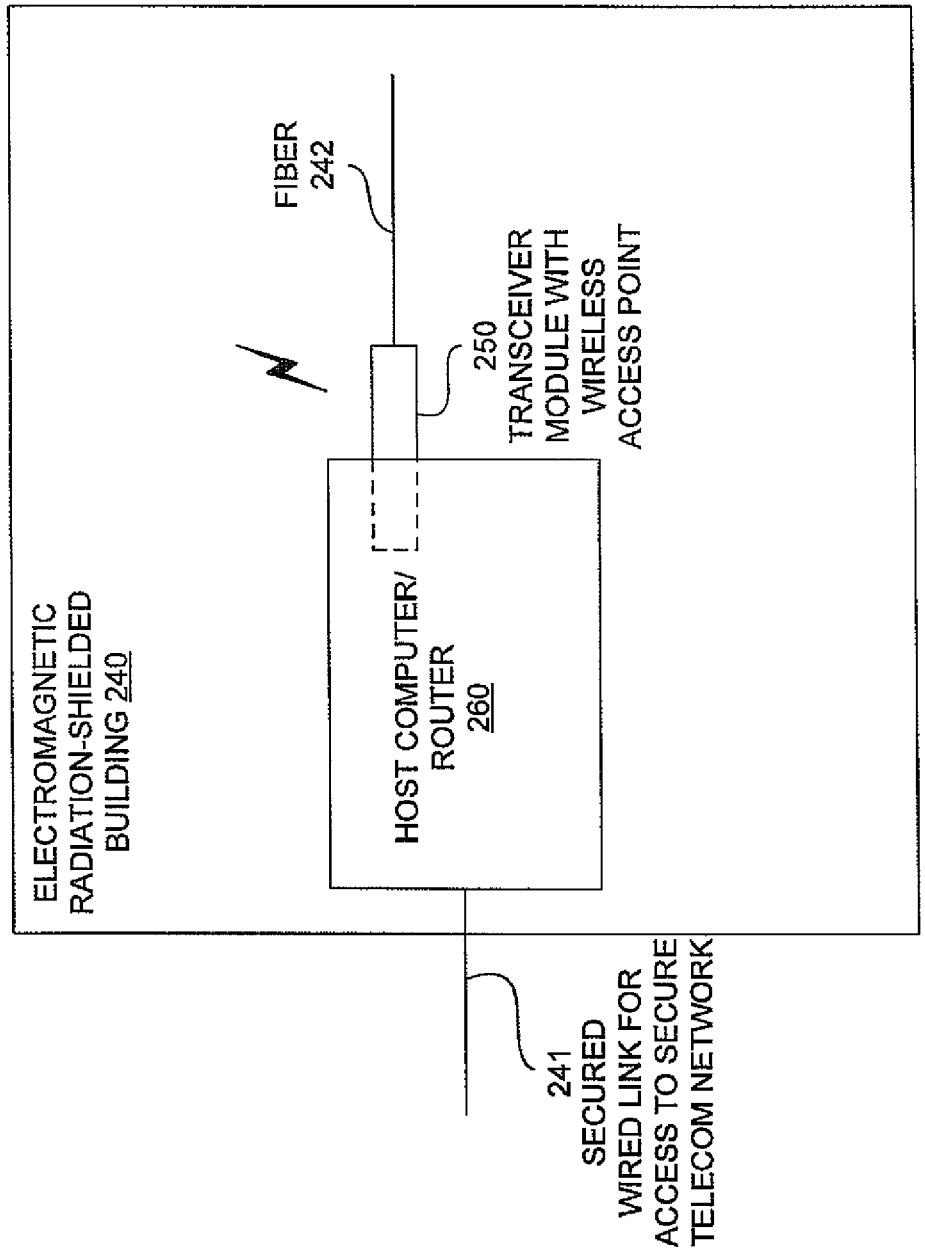
FIG. 7 illustrates a block diagram of an electromagnet radiation-shielded building in which a transceiver module having a wireless access point communications device such as that shown in FIG. 6, for example, has been inserted into a receptacle of a host computer/router.

FIG. 7 illustrates a block diagram of an electromagnet radiation-shielded building 240 in which a transceiver module 250 having a wireless access point communications device such as that shown in FIG. 6, for example, has been inserted into a receptacle (not shown) of a host computer/router 260. The host computer/router 260 is connected via a secured wired link 241 to a secure telecommunications network (not shown). Within the shielded building, users can access the secure telecommunications network via fiber 242 or via wireless devices (not shown) that communicate wirelessly with the wireless access point of the transceiver module 250. Multiple host computers/routers (not shown) within the shielded building 240 that are equipped with the transceiver modules 250 having wireless access points could be used to setup a secure wireless network within the shielded building from which users could wirelessly, or through fiber, access the secure telecommunications network via secure wired link 241.

Figure 8:
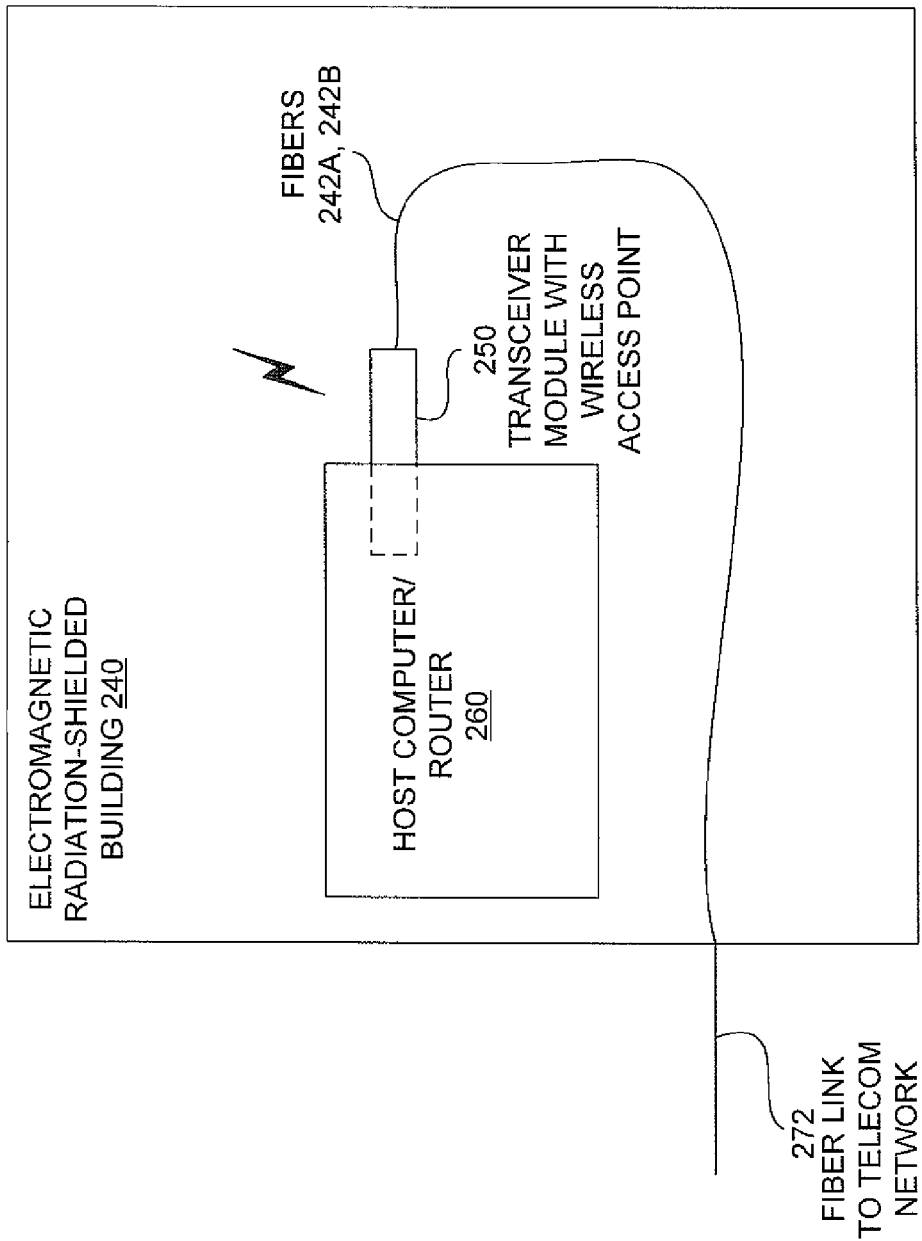
FIG. 8 illustrates a block diagram of the shielded building shown in FIG. 7 having the host computer/router therein and the transceiver module connected thereto, with the transmit and receive fibers connected to an optical link that connects to an external telecommunications network.

FIG. 8 illustrates a block diagram of the shielded building 240 shown in FIG. 7 having the host computer/router 260 therein and the transceiver module 250 connected thereto. However, in accordance with this embodiment, the secure wired link 241 has been eliminated and replaced with an optical fiber link 272, which is connected to an external telecommunications network. The transmit and receive fibers 242A and 242B that are connected to the optical transceiver module 250 are connected to the fiber link 272 and are used to access the external telecommunications network. Like the embodiment described above with reference to FIG. 7, users within the building 240 are able to access the secure telecommunications network by sending data to and receiving data from the wireless access point of the transceiver module 250. The data is sent to and received from the telecommunications network over fibers 242A and 242B and fiber link 272.

It should be noted that the invention has been described with reference to various illustrative embodiments for the purposes of describing the principles and concepts of the invention. It will be understood by those skilled in the art, in view of the description provided herein, that many modifications can be made to the embodiments described herein without deviating from the invention. All such modifications are within the scope of the invention. For example, although the transceiver modules have been described as using laser diodes as the light sources for generating the optical data signals, the invention is not limited to using any particular type of light source in the transceiver modules. Any type of light source that is capable of generating optical data signals may be used for this purpose, including, for example, light emitting diodes (LEDs) and other light sources. Likewise, the invention is not limited to using photodiodes in the receiver portions of the transceiver modules as optical-to-electrical converters. Any device that is capable of detecting optical signals and producing corresponding electrical signals is suitable for this purpose.

The invention claimed is:

1. An optical transceiver module comprising:

a transceiver module controller, the controller generating one or more signals including at least a light source driver control signal;

a light source driver, the driver receiving a data signal at an input terminal of the driver, the driver receiving the driver control signal at a control signal terminal of the driver, the driver producing a modulation signal that is output at an output terminal of the driver;

a light source, the light source receiving the modulation signal from the driver and producing an optical data signal for transmission over an optical transmit waveguide;

a receiver, the receiver receiving an optical data signal carried on an optical receive waveguide and converting the optical data signal into an electrical data signal and sending the electrical data signal to an output terminal of the receiver;

a wireless communications device, wherein the wireless communications device is configured to perform one or more tasks of:
  transmitting wireless signals from the transceiver module,
  receiving wireless signals in the transceiver module, and
  transmitting wireless signals from and receiving wireless signals in the transceiver module; and a switching device coupled to the input terminal of the driver and coupled to the output terminal of the receiver, the switching device being coupled to the wireless communications device and a wired network, the switching device selectively routing data signals for the input terminal and from the output terminal among the wireless communications device and the wired network in response to control signals received from the transceiver module controller.

2. The optical transceiver module of claim 1, wherein the wireless communications device is configured to at least perform the task of transmitting wireless signals from the optical transceiver module, the wireless signals transmitted including one or more of wireless calls, wireless pages, and wireless data transfers.

3. The optical transceiver module of claim 2, wherein the wireless signals transmitted from the transceiver module include at least wireless data transfers, the wireless data transfers transferring data from the transceiver module to a wireless network or wireless device, the transferred data corresponding to data that has been received over the optical receive waveguide as optical data signals and converted into electrical data signals in the receiver, the wireless communications device converting the electrical data signals into wireless data signals suitable for transmission over the wireless network or to a wireless device.

4. The optical transceiver module of claim 3, wherein the wireless communications device is configured to also perform the task of receiving wireless signals in the optical transceiver module, the wireless signals received including at least wireless data transfers, the wireless data transfers transferring data from a wireless network or wireless device to the transceiver module, the transferred data being converted in the transceiver module from wireless data into electrical data and input to the input terminal of the driver, the driver producing a modulation signal based on the data input to the input terminal, the modulation signal being output from the driver to the light source, the light source being modulated by the modulation signal to produce an optical data signal for transmission over the optical transmit waveguide.

5. The optical transceiver module of claim 1, wherein the wireless communications device is configured to at least perform the task of receiving wireless signals in the optical transceiver module, the wireless signals received including one or more of wireless calls, wireless pages, and wireless data transfers.

6. The optical transceiver module of claim 5, wherein the wireless signals received in the transceiver module include at least wireless data transfers, the wireless data transfers transferring data from a wireless network or wireless device to the transceiver module, the transferred data being converted in the transceiver module from wireless data into electrical data in the receiver and input to the input terminal of the driver, the driver producing a modulation signal based on the data input to the input terminal, the modulation signal being output from the driver to the light source, the light source being modulated by the modulation signal to produce an optical data signal for transmission over the optical transmit waveguide.

7. The optical transceiver module of claim 6, wherein the wireless communications device is configured to also perform the task of transmitting wireless signals from the optical transceiver module, the wireless signals transmitted including at least wireless data transfers, wherein the wireless data transfers transfer data from the transceiver module to a wireless network or wireless device, the transferred data corresponding to data that has been received over the optical receive waveguide as optical data signals and converted into electrical data signals in the receiver, the wireless communications device converting the electrical data signals into wireless data signals suitable for transmission over the wireless network or to the wireless device.

8. The optical transceiver module of claim 1, wherein the wireless communications device is configured to perform the tasks of transmitting wireless signals from the optical transceiver module and receiving wireless signals in the optical transceiver module, the wireless signals transmitted from and received in the transceiver module including one or more of wireless calls, wireless pages, and wireless data transfers.

9. The optical transceiver module of claim 1, wherein the wireless communications device is a wireless modem.

10. The optical transceiver module of claim 1, wherein the wireless communications device is a wireless receiver.

11. The optical transceiver module of claim 1, wherein the wireless communications device is a wireless transceiver.

12. The optical transceiver module of claim 1, wherein the wireless communications device is a wireless transmitter.

13. The optical transceiver module of claim 1, wherein the wireless communications device is a network access point capable of transmitting and receiving wireless signals.

14. The optical transceiver module of claim 13, wherein the wireless communications device is installed in a computer.

15. The optical transceiver module of claim 14, wherein the computer is a router.

16. A method for providing wireless communications capabilities in an optical transceiver module, the method comprising:
  providing an optical transceiver module with a wireless communications device, the transceiver module comprising a driver, a receiver, and a transceiver module controller;
  providing a switching device coupled to an input terminal of the driver and coupled to an output terminal of the receiver, and coupled to the wireless communications device and a wired network, the switching device being controlled by the transceiver module controller for selectively routing data signals to the input terminal and from the output terminal among the wireless communications device and the wired network; and
  in the wireless communications device, performing one or more of tasks of:
    transmitting wireless signals from the transceiver module,
    receiving wireless signals in the transceiver module, and
    transmitting wireless signals from and receiving wireless signals in the transceiver module.

17. The method of claim 16, wherein the wireless communications device at least performs the task of transmitting wireless signals from the optical transceiver module, the wireless signals transmitted including one or more of wireless calls, wireless pages, and wireless data transfers.

18. The method of claim 17, wherein the wireless signals transmitted from the transceiver module include at least wireless data transfers, the wireless data transfers transferring data from the transceiver module to a wireless network or wireless device, the transferred data corresponding to data that has been received over an optical receive waveguide in the transceiver module as optical data signals and converted into electrical data signals, the wireless communications device converting the electrical data signals into wireless data signals suitable for transmission over the wireless network or to the wireless device.

19. The method of claim 18, wherein the wireless communications device also performs the task of receiving wireless signals in the optical transceiver module, the wireless signals received including at least wireless data transfers, the wireless data transfers transferring data from a wireless network or wireless device to the transceiver module, the method further comprising: in the transceiver module, converting the transferred data from wireless data into electrical data and inputting the electrical data to an input terminal of a light source driver of the transceiver module; in the driver of the transceiver module, producing a modulation signal based on the data input to the input terminal, the modulation signal being output from the driver to a light source; and modulating the light source with the modulation signal to produce an optical data signal for transmission over an optical transmit waveguide.

20. The method of claim 16, wherein the wireless communications device at least performs the task of receiving wireless signals in the optical transceiver module, the wireless signals received including one or more of wireless calls, wireless pages, and wireless data transfers.

21. The method of claim 20, wherein the wireless signals received in the transceiver module include at least wireless data transfers, the wireless data transfers transferring data from a wireless network or wireless device to the transceiver module, the method further comprising: in the transceiver module, converting the transferred data from wireless data into electrical data and inputting the electrical data to an input terminal of a light source driver of the transceiver module; in the light source driver of the transceiver module, producing a modulation signal based on the data input to the input terminal, the modulation signal being output from the driver to a light source; and modulating the light source with the modulation signal to produce an optical data signal for transmission over an optical transmit waveguide.

22. The method of claim 21, wherein the wireless communications device is configured to also perform the task of transmitting wireless signals from the optical transceiver module, the wireless signals transmitted including at least wireless data transfers, wherein the wireless data transfers transfer data from the transceiver module to a wireless network or a wireless device, the transferred data corresponding to data that has been received in the optical transceiver module over an optical receive waveguide in a form of optical data signals and converted in a receiver of the transceiver module into electrical data signals, the wireless communications device converting the electrical data signals into wireless data signals suitable for transmission over a wireless network or to a wireless device.

23. The method of claim 16, wherein the wireless communications device performs the tasks of transmitting wireless signals from the optical transceiver module and receiving wireless signals in the optical transceiver module, the wireless signals transmitted from and received in the transceiver module including one or more of wireless calls, wireless pages, and wireless data transfers.

24. The method of claim 16, wherein the wireless communications device is a wireless modem.

25. The method of claim 16, wherein the wireless communications device is a wireless receiver.

26. The method of claim 16, wherein the wireless communications device is a wireless transceiver.

27. The method of claim 16, wherein the wireless communications device is a wireless transmitter.

28. The method of claim 16, wherein the wireless communications device is a network access point capable of transmitting and receiving wireless signals.

29. The method of claim 28, wherein the wireless communications device is installed in a computer.

30. The method of claim 29, wherein the computer is a router.

\* \* \* \* \*